(12) United States Patent
Yamamoto et al.

(10) Patent No.: US 12,067,795 B2
(45) Date of Patent: Aug. 20, 2024

(54) INFORMATION PROCESSING DEVICE AND INFORMATION PROCESSING METHOD

(71) Applicant: Sony Group Corporation, Tokyo (JP)

(72) Inventors: Yuki Yamamoto, Tokyo (JP); Ryuta Satoh, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 300 days.

(21) Appl. No.: 17/440,194

(22) PCT Filed: Mar. 17, 2020

(86) PCT No.: PCT/JP2020/011600
§ 371 (c)(1),
(2) Date: Sep. 17, 2021

(87) PCT Pub. No.: WO2020/203240
PCT Pub. Date: Oct. 8, 2020

(65) Prior Publication Data
US 2022/0012552 A1   Jan. 13, 2022

(30) Foreign Application Priority Data

Mar. 29, 2019   (JP) ................................ 2019-068492

(51) Int. Cl.
*G06V 30/00* (2022.01)
*G06V 30/194* (2022.01)

(52) U.S. Cl.
CPC .................................. *G06V 30/194* (2022.01)

(58) Field of Classification Search
CPC .... G06V 30/194; G06V 10/95; G06V 10/809; G06V 20/56; G06V 10/10; G06N 3/045;
(Continued)

(56) References Cited

FOREIGN PATENT DOCUMENTS

| JP | 2016-57701 A | 4/2016 |
| JP | 2016-173682 A | 9/2016 |

(Continued)

OTHER PUBLICATIONS

Sheng et al., A communication-efficient model of sparse neural network for distributed intelligence, IEEE Conference on Computer Communications Workshops (Infocom Wkshps) (Year: 2016).*

(Continued)

*Primary Examiner* — Ping Y Hsieh
*Assistant Examiner* — Xiao Liu
(74) *Attorney, Agent, or Firm* — XSENSUS LLP

(57) ABSTRACT

An information processing device on a server side includes: a predetermined number of recognition units, for which a model updated by performing image recognition in a predetermined number of vehicles and executing unsupervised learning is each set, configured to perform image recognition on an image, on which image recognition has been performed in a predetermined number of the vehicles; and an evaluation value calculation unit configured to evaluate recognition results obtained in a predetermined number of the recognition units and calculate an evaluation value for each of the recognition units. The information processing device on the vehicle side includes an execution unit that executes unsupervised learning, and a determination unit that determines whether learning has been performed correctly or not for a model updated in the execution unit on the basis of an evaluation value found on the server side.

11 Claims, 13 Drawing Sheets

(58) Field of Classification Search
CPC .......... G06N 3/088; G06N 20/00; G06T 7/00;
G06T 2207/20081
See application file for complete search history.

(56) References Cited

FOREIGN PATENT DOCUMENTS

| JP | 2017-174298 A | | 9/2017 |
|----|---------------|---|--------|
| JP | 2017174298 A | * | 9/2017 |
| JP | 2018-207222 A | | 12/2018 |

OTHER PUBLICATIONS

Yiqiang Sheng et al: "A communication-efficient model of sparse neural network for distributed intelligence", 2016 IEEE Conference on Computer Communications Workshops (Infocom Wkshps), IEEE, Apr. 10, 2016 (Apr. 10, 2016), pp. 515-520,XP032957347,DOI: 10.1109/INFCOMW.2016.7562131 [retrieved on Sep. 6, 2016] abstract p. 3-p. 5; figures 2-3.

Zhang Weichen et al: "Collaborative and Adversarial Network for Unsupervised Domain Adaptation", 2018 IEEE/CVF Conference on Computer Vision and Pattern Recognition, IEEE, Jun. 18, 2018 (Jun. 18, 2018), pp. 3801-3809, XP033476351, DOI: 10.1109/CVPR. 2018.00400 [retrieved on Dec. 14, 2018] the whole document.

International Search Report and Written Opinion mailed on Jun. 2, 2020, received for PCT Application PCT/JP2020/011600, Filed on Mar. 17, 2020, 8 pages including English Translation.

* cited by examiner

INFORMATION PROCESSING DEVICE AND INFORMATION PROCESSING METHOD

CROSS-REFERENCE TO RELATED APPLICATIONS

The present application is based on PCT filing PCT/JP2020/011600, filed Mar. 17, 2020, which claims priority to JP 2019-068492, filed Mar. 29, 2019, the entire contents of each are incorporated herein by reference.

TECHNICAL FIELD

The present disclosure relates to an information processing device and an information processing method, and more particularly, to an information processing device and an information processing method capable of further improving recognition performance.

BACKGROUND ART

Conventionally, learning using supervised data is generally performed in image recognition by, for example, a convolutional neural network (CNN) in deep learning.

Furthermore, Patent Document 1 discloses, for example, a neural network system in which a management device receives weight parameters obtained by learning in a plurality of terminal devices, and an optimal weight parameter is selected.

CITATION LIST

Patent Document

Patent Document 1: Japanese Patent Application Laid-Open No. 2017-174298

SUMMARY OF THE INVENTION

Problems to be Solved by the Invention

By the way, in learning in which conventional image recognition is performed, not only cost is required to prepare supervised data, but also recognition performance for data is deteriorated in a case where data having a distribution different from that of the supervised data is inputted.

The present disclosure has been made in view of such a situation, and aims to further improve recognition performance.

Solutions to Problems

An information processing device according to a first aspect of the present disclosure includes: a predetermined number of recognition units, for which a model updated by performing image recognition in a predetermined number of terminals and executing unsupervised learning is each set, configured to perform image recognition on an image, on which image recognition has been performed in a predetermined number of the terminals; and an evaluation value calculation unit configured to evaluate recognition results obtained in a predetermined number of the recognition units and calculate an evaluation value for each of the recognition units.

An information processing method according to a first aspect of the present disclosure includes: by an information processing device, performing image recognition on an image, on which image recognition has been performed in a predetermined number of terminals, in a predetermined number of recognition units for which a model updated by performing image recognition in a predetermined number of the terminals and executing unsupervised learning is each set; and evaluating recognition results obtained in a predetermined number of the recognition units and calculating an evaluation value for each of the recognition units.

In the first aspect of the present disclosure, image recognition is performed on an image, for which image recognition has been performed in a predetermined number of terminals, in a predetermined number of recognition units, for which a model updated by performing image recognition in a predetermined number of the terminals and executing unsupervised learning is each set, recognition results obtained in a predetermined number of the recognition units are evaluated, and an evaluation value is calculated for each of the recognition units.

An information processing device according to a second aspect of the present disclosure includes: an execution unit configured to execute unsupervised learning for a model of a recognizer that performs image recognition on an image; and a determination unit that determines whether learning has been performed correctly or not for the model updated by learning in the execution unit on the basis of an evaluation value found using recognition results obtained by performing image recognition in a predetermined number of models different from each other, in which the execution unit returns a model to a model before the learning has been performed in a case where it is determined by the determination unit that learning has not been performed correctly.

An information processing method according to the second aspect of the present disclosure includes: by an information processing device, executing unsupervised learning for a model of a recognizer that performs image recognition on an image; and determining whether learning has been performed correctly or not for the model updated by the learning on the basis of an evaluation value found using recognition results obtained by performing image recognition in a predetermined number of models different from each other, in which a model is returned to a model before the learning has been performed in a case where it is determined that learning has not been performed correctly.

In the second aspect of the present disclosure, unsupervised learning for a model of a recognizer that performs image recognition on an image is executed, and whether learning has been performed correctly or not is determined for the model updated by the learning on the basis of an evaluation value found using recognition results obtained by performing image recognition in a predetermined number of models different from each other. Then, in a case where it is determined that the learning is not performed correctly, the model is returned to a model before the learning is performed.

MODE FOR CARRYING OUT THE INVENTION

Hereinafter, specific embodiments to which the present technology is applied will be described in detail with reference to the drawings.

<Learning Processing>

First, learning processing will be described with reference to FIGS. 1 to 3.

Figure 1:
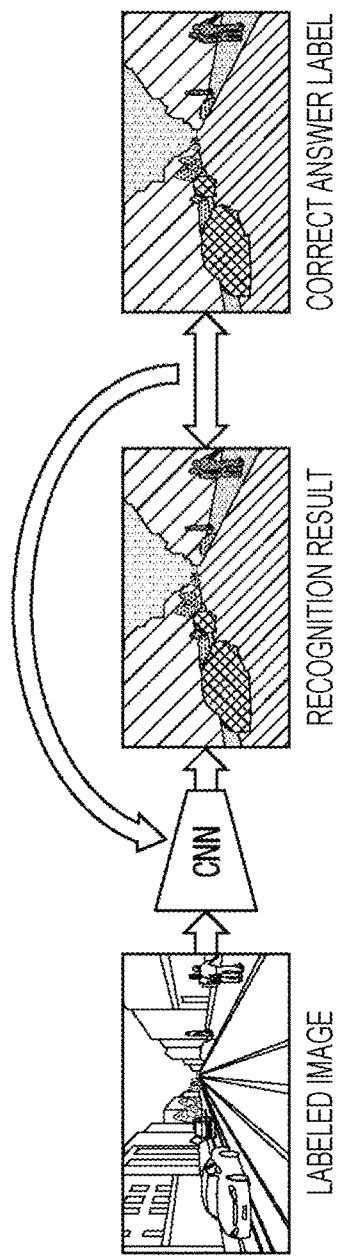
FIG. 1 is a diagram for explaining conventional learning processing.

FIG. 1 is a diagram schematically illustrating the flow of processing in conventional learning processing.

As illustrated in FIG. 1, in the conventional learning processing, a recognizer CNN that performs image recognition using deep learning is used, and a labeled image in which labels for classifying a plurality of subjects included in an image are created in advance is inputted to the recognizer CNN.

For example, the recognizer CNN performs image recognition on the labeled image, recognizes a plurality of subjects included in the labeled image, and outputs a recognition result obtained by classifying the respective subjects. Then, the recognition result outputted from the recognizer CNN is compared with a correct answer label for the labeled image, and feedback to the recognizer CNN is performed so that the recognition result is brought closer to the correct answer label.

As described above, in the conventional learning processing, learning that enables the recognizer CNN to perform more accurate image recognition is performed using a correct answer label.

Thus, we try to enable accurate image recognition without using a correct answer label as described with reference to FIGS. 2 and 3.

Figure 2:
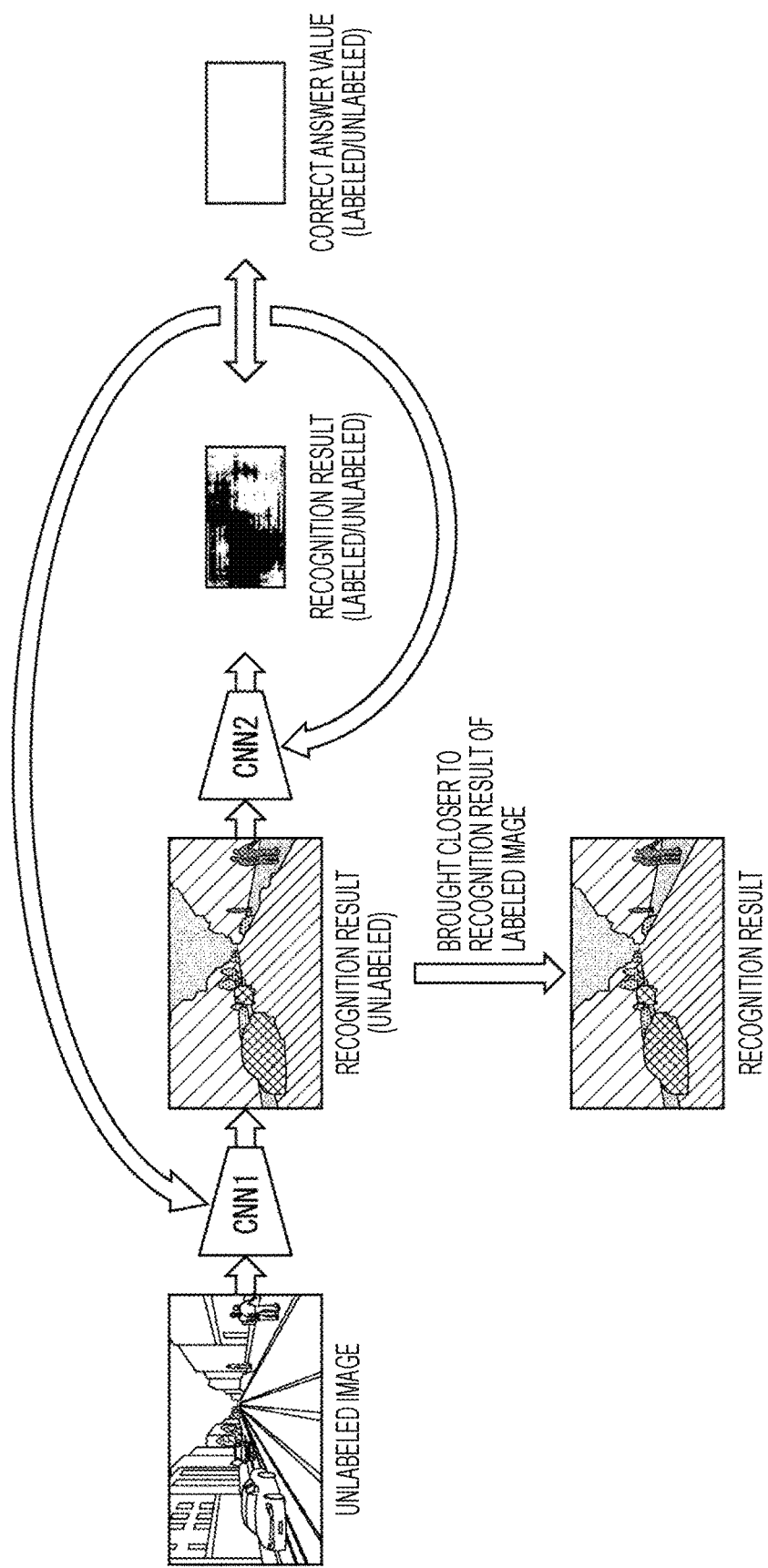
FIG. 2 is a diagram for explaining learning processing to which the present technology is applied.
Figure 3:
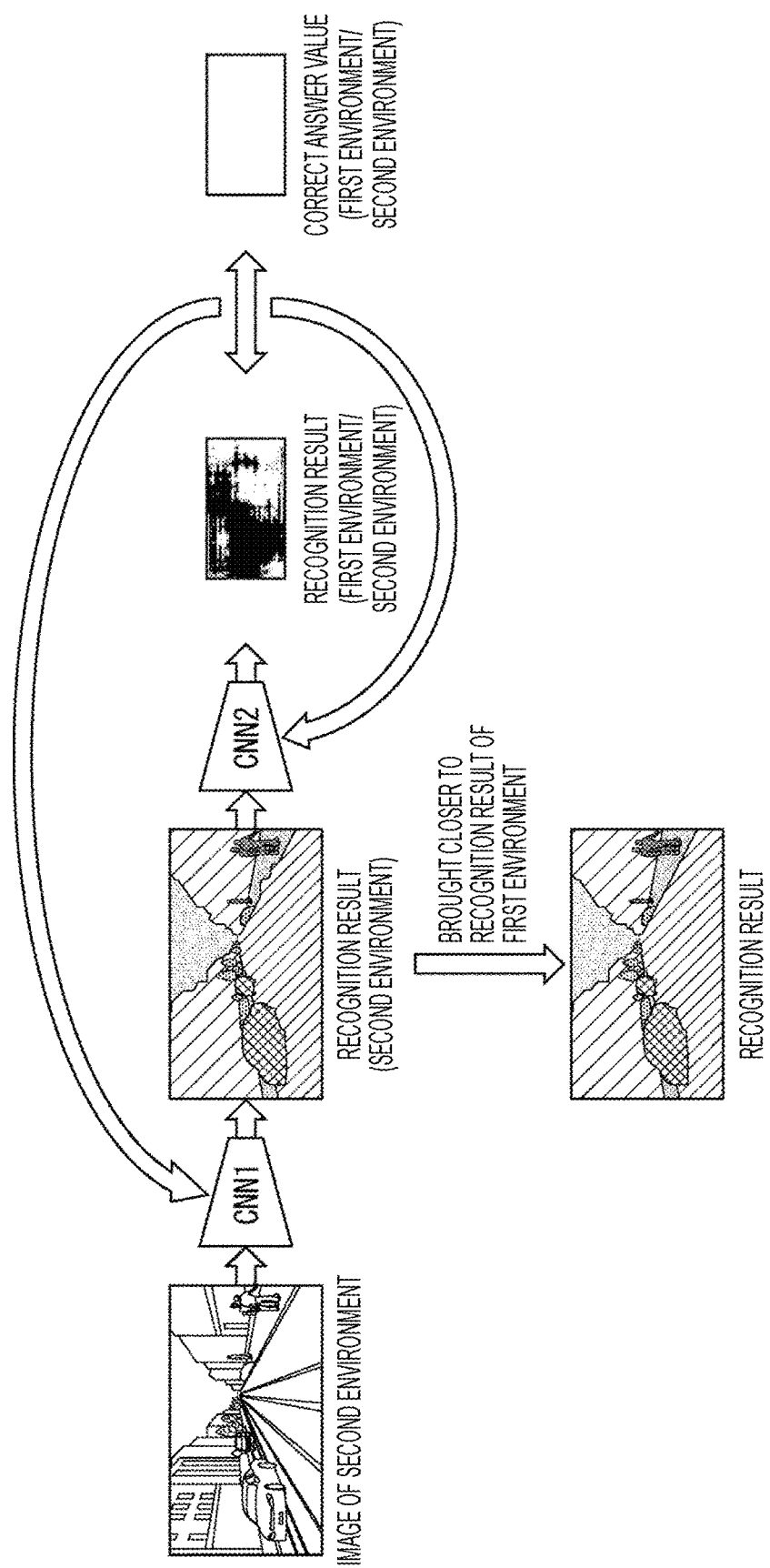
FIG. 3 is a diagram for explaining learning processing to which the present technology is applied.

FIGS. 2 and 3 are diagrams schematically illustrating the flow of processing in learning processing to which the present technology is applied. Although hereinafter two types of images, that is, an image (which will be hereinafter referred to as a labeled image) for which a correct answer label is prepared and an image (which will be hereinafter referred to as an unlabeled image) for which a correct answer label is not necessarily prepared will be exemplified first in order to facilitate understanding of the description, a correct answer label is unnecessary in learning processing to which the present technology is applied as illustrated in FIGS. 2 and 3. That is, no correct answer label is prepared for the two types of input images used in the learning processing to which the present technology is applied, and the learning processing is performed using such images.

As illustrated in FIGS. 2 and 3, in the learning processing to which the present technology is applied, two recognizers CNN1 and CNN2 are used, and there may be no correct answer label corresponding to an image inputted to the recognizer CNN1.

For example, in the learning processing illustrated in FIG. 2, the recognizer CNN1 performs image recognition on an unlabeled image and outputs a recognition result (unlabeled) obtained by classifying a plurality of subjects included in the unlabeled image. Moreover, this recognition result is inputted to the recognizer CNN2, and learning that enables the recognizer CNN2 to distinguish between the recognition result (labeled) and the recognition result (unlabeled) is performed using a correct answer value (labeled/unlabeled).

Then, by feeding back the result of learning in the recognizer CNN2 to the recognizer CNN1, the recognition result of the recognizer CNN1 for the unlabeled image can be brought closer to the labeled recognition result. Therefore, in the example illustrated in FIG. 2, the recognizer CNN1 can accurately classify a portion of the unlabeled image where the subject has not been accurately classified, with respect to the boundary between the roadway and the sidewalk on the right side of the recognition result.

Furthermore, in the learning processing illustrated in FIG. 3, two images (an image of a first environment and an image of a second environment) captured in different environments are used.

That is, the recognizer CNN1 performs image recognition on an image of the second environment, and outputs a recognition result (second environment) obtained by classifying a plurality of subjects included in the image of the second environment. Moreover, this recognition result is inputted to the recognizer CNN2, and learning that enables the recognizer CNN2 to distinguish between the recognition result (first environment) and the recognition result (second environment) is performed using the correct answer value (first environment/second environment).

Then, by feeding back the result of learning in the recognizer CNN2 to the recognizer CNN1, the recognition result of the recognizer CNN1 for the image of the second environment can be brought closer to the recognition result of the first environment. Therefore, the recognizer CNN1 can accurately classify a portion of an image of the second environment where the subject has not been accurately classified, similarly to the example illustrated in FIG. 2. Accordingly, learning processing for accurately performing image recognition is performed using the image of the first environment and the image of the second environment for which there is no correct answer label.

As described above, in the learning processing to which the present technology is applied, the recognizer CNN1 can accurately perform image recognition without preparing a correct answer label, and accurate image recognition can be performed on an unlabeled image, that is, recognition performance can be improved.

Note that, as described with reference to FIGS. 2 and 3, learning processing performed without supervision using an image for which a correct answer label is not necessarily prepared will be hereinafter referred to as domain adaptation processing.

Configuration Example of Learning System

Figure 4:
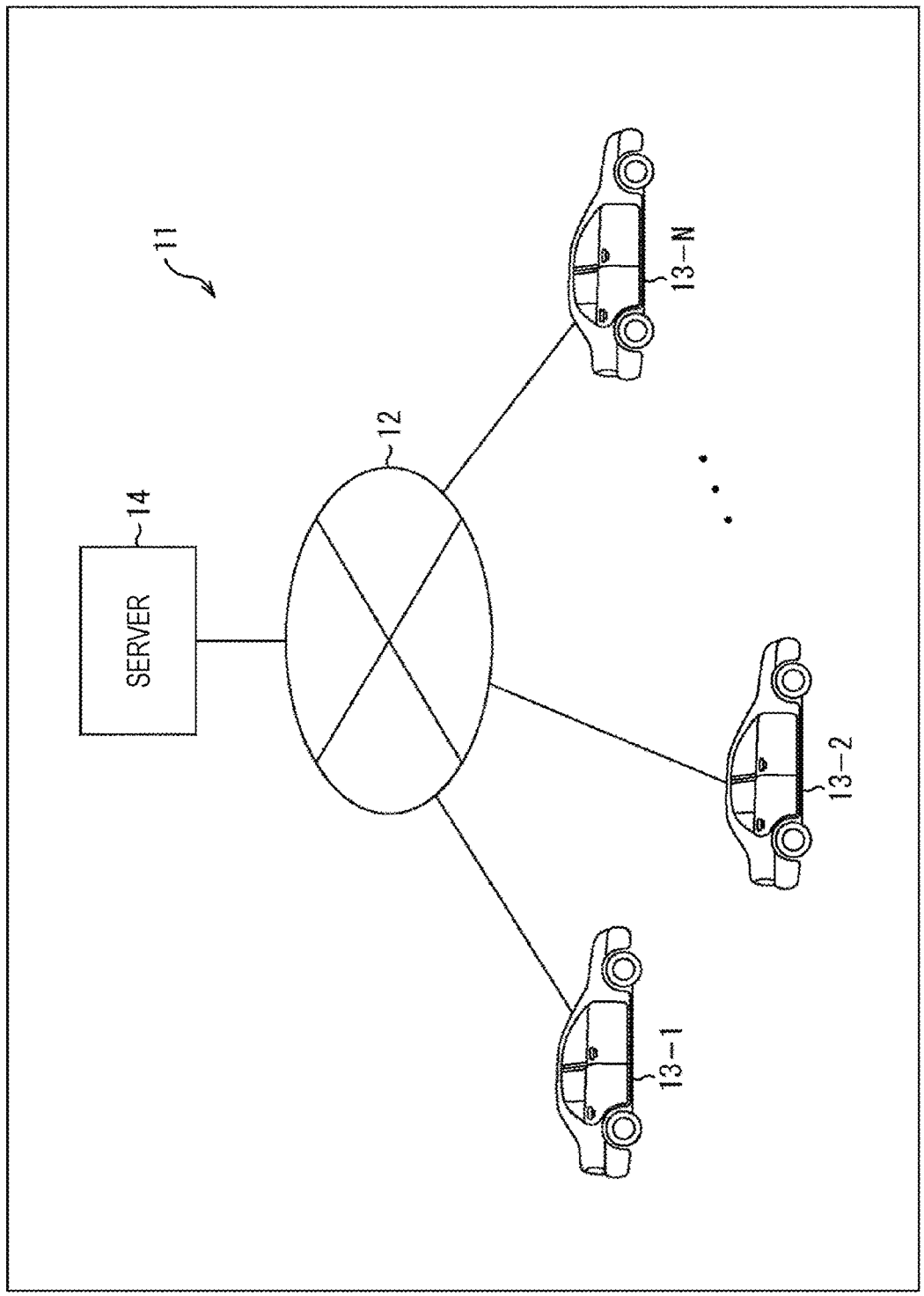
FIG. 4 is a block diagram illustrating a configuration example of an embodiment of a learning system to which the present technology is applied.

FIG. 4 is a block diagram illustrating a configuration example of an embodiment of a learning system to which the present technology is applied.

A learning system 11 illustrated in FIG. 4 is configured by connecting N vehicles 13-1 to 13-N with a server 14 via a network 12, and each of the vehicles 13-1 to 13-N includes a recognizer. Note that the vehicles 13-1 to 13-N are configured similarly, and are also simply referred to as vehicles 13 hereinafter in a case where it is not necessary to distinguish therebetween.

In the learning system 11, learning of domain adaptation processing is performed on images captured in the vehicles 13-1 to 13-N in real time (e.g., frame rate level) inside each of the vehicles 13-1 to 13-N. Then, in the learning system 11, N images captured in the vehicles 13-1 to 13-N and models of N recognizers are uploaded to the server 14 via the network 12.

Therefore, in the learning system 11, N images accumulated from the vehicles 13-1 to 13-N in the server 14 are inputted to all the N recognizers configured with respective models of the vehicles 13-1 to 13-N. Then, in the server 14, an integrated recognition result in which the recognition results obtained by N recognizers are integrated is calculated, and each recognition result is evaluated using the integrated recognition result and the respective recognition results of the N recognizers. For example, the evaluation value for evaluating the recognition result is calculated at every constant period longer than the frame rate at which images are captured in a vehicle 13.

Thereafter, in the learning system 11, feedback is performed from the server 14 to the vehicle 13 including the recognizer of the model from which a recognition result has been obtained in a case where the evaluation value representing the evaluation for the recognition result is equal to or smaller than a certain value. In response to this, in the vehicle 13, the model at that time is rolled back to the state before learning, and the input data used for the learning is discarded.

Here, in the learning system 11, the recognizers included in the vehicles 13-1 to 13-N are configured similarly, images captured in the respective vehicles 13 are inputted to the recognizers, and recognition results obtained by performing image recognition on the images are outputted. Furthermore, in the server 14, evaluation and feedback are not always operated but are operated only when verifying the domain adaptation processing in the vehicles 13-1 to 13-N, for example, once in approximately several hours. That is, in the learning system 11, learning processing is performed at a high frequency in the vehicles 13-1 to 13-N, and evaluation and feedback are performed at a low frequency in the server 14.

Figure 5:
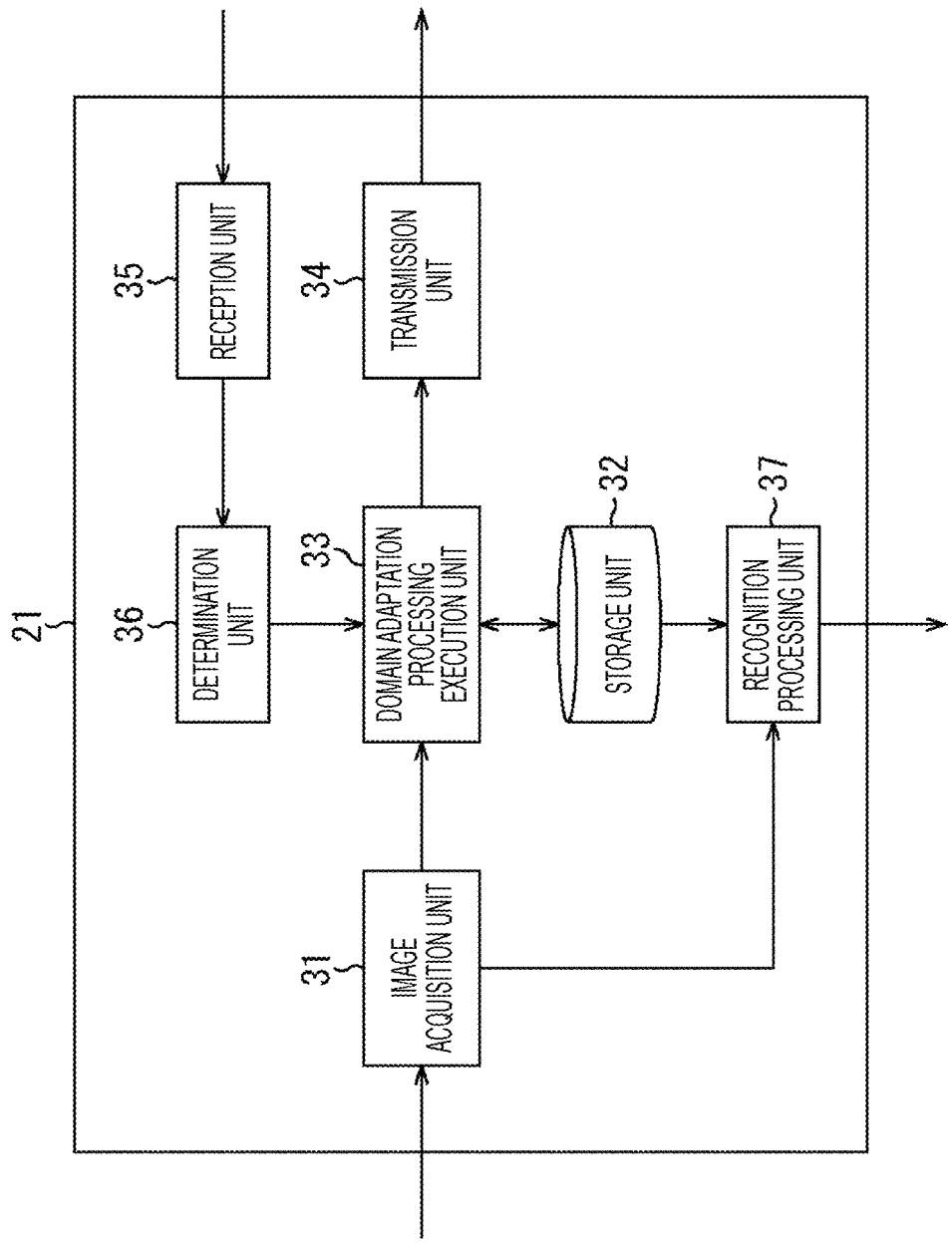
FIG. 5 is a block diagram illustrating a configuration example of an information processing device on the vehicle side.

FIG. 5 is a block diagram illustrating a configuration example of an information processing device 21 included in the vehicle 13.

As illustrated in FIG. 5, the information processing device 21 includes an image acquisition unit 31, a storage unit 32, a domain adaptation processing execution unit 33, a transmission unit 34, a reception unit 35, a determination unit 36, and a recognition processing unit 37.

The image acquisition unit 31 acquires an image captured by an image pickup device (not shown) mounted on the vehicle 13, and supplies the image to the domain adaptation processing execution unit 33 and the recognition processing unit 37.

The storage unit 32 stores a model of a recognizer that performs image recognition in the information processing device 21. For example, the storage unit 32 stores an initial model that is a model set as an initial state, a newest model updated in the domain adaptation processing execution unit 33, a model immediately before the update, and the like.

The domain adaptation processing execution unit 33 sets the model loaded from the storage unit 32 to a recognizer, and executes domain adaptation processing on the image supplied from the image acquisition unit 31. Then, the domain adaptation processing execution unit 33 supplies a model set in the recognizer and an image used for image recognition to the transmission unit 34, for example, at a timing when evaluation and feedback are performed in the server 14. Furthermore, in a case where the model of the recognizer has been learned correctly, the domain adaptation processing execution unit 33 can supply the model to the storage unit 32 to update the model. Note that a detailed configuration of the domain adaptation processing execution unit 33 will be described later with reference to FIG. 6.

The transmission unit 34 acquires additional information (e.g., position information of vehicle 13, vehicle type information, image pickup equipment information, image pickup condition information, etc.) from a high-order control device (not shown) together with an image and a model supplied from the domain adaptation processing execution unit 33, and transmits the additional information to the server 14 via the network 12 in FIG. 1.

The reception unit 35 receives the evaluation value transmitted from the server 14 via the network 12, and supplies the evaluation value to the determination unit 36.

The determination unit 36 compares the evaluation value found in the server 14 with a predetermined evaluation value threshold, determines whether learning has been performed correctly in the domain adaptation processing execution unit 33 or not, and notifies the domain adaptation processing execution unit 33 of the determination result.

The recognition processing unit 37 reads the newest model from the storage unit 32, performs recognition processing on the image supplied from the image acquisition unit 31 using the recognizer for which the model is set, and outputs a recognition result obtained by the recognition processing. For example, the recognition result obtained by the recognition processing unit 37 is inputted to the automatic driving system of the vehicle 13, and the automatic driving of the vehicle 13 is controlled using the recognition result. Accordingly, when the recognition processing unit 37 uses a model learned correctly in the domain adaptation processing execution unit 33, the recognition performance of the recognition processing unit 37 is improved, and safer automatic driving can be realized.

Figure 6:
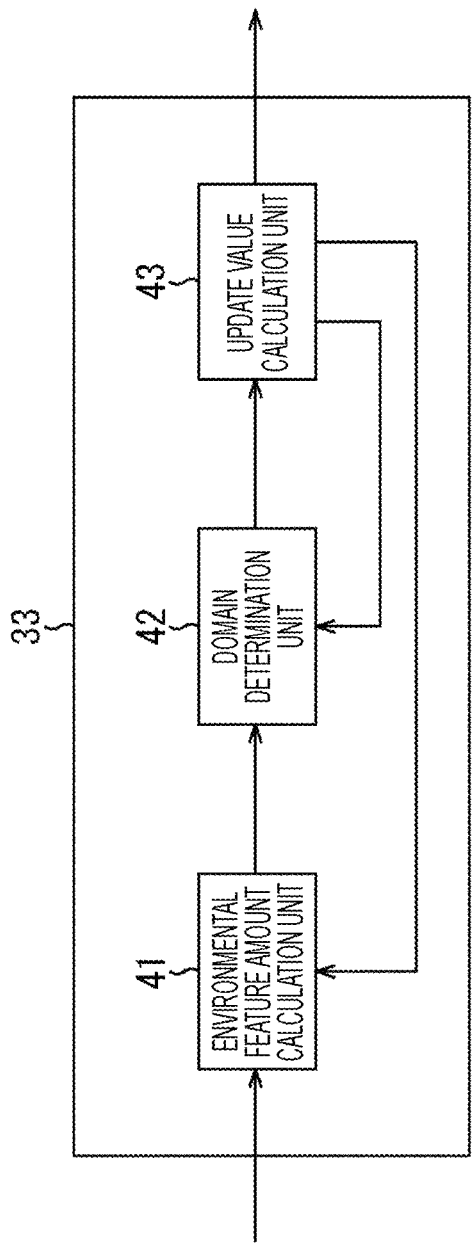
FIG. 6 is a block diagram illustrating a configuration example of a domain adaptation processing execution unit.

FIG. 6 is a block diagram illustrating a configuration example of the domain adaptation processing execution unit 33 in FIG. 5.

As illustrated in FIG. 6, the domain adaptation processing execution unit 33 includes an environmental feature amount calculation unit 41, a domain determination unit 42, and an update value calculation unit 43, and a recognizer is configured with, for example, the environmental feature amount calculation unit 41 and the domain determination unit 42.

The environmental feature amount calculation unit 41 calculates the environmental feature amount indicating the feature of each pixel of the image from the image supplied from the image acquisition unit 31 in FIG. 5 using a predetermined coefficient, and supplies the environmental feature amount to the domain determination unit 42.

The domain determination unit 42 classifies the environmental feature amount supplied from the environmental feature amount calculation unit 41 according to a predetermined threshold, and performs domain determination to determine a region including pixels indicating the environmental feature amount classified by the threshold as one domain. Then, the domain determination unit 42 supplies the recognition result obtained by classifying the domain determination result obtained as a result of performing domain determination for each subject included in the image as illustrated in FIGS. 2 and 3, for example, to the update value calculation unit 43.

The update value calculation unit 43 calculates an environmental feature amount calculation update value for updating a coefficient used for calculation of an environmental feature amount in the environmental feature amount calculation unit 41, and a domain determination update value for updating a threshold used for domain determination in the domain determination unit 42 according to the domain determination result supplied from the domain determination unit 42. Then, the update value calculation unit 43 feeds back the environmental feature amount calculation update value to the environmental feature amount calculation unit 41, and feeds back the domain determination update value to the domain determination unit 42.

Moreover, the update value calculation unit 43 supplies a coefficient used for calculation of the environmental feature amount in the environmental feature amount calculation unit 41, and a threshold used for domain determination in the domain determination unit 42 to the transmission unit 34 in FIG. 5 as a model of the recognizer.

Figure 7:
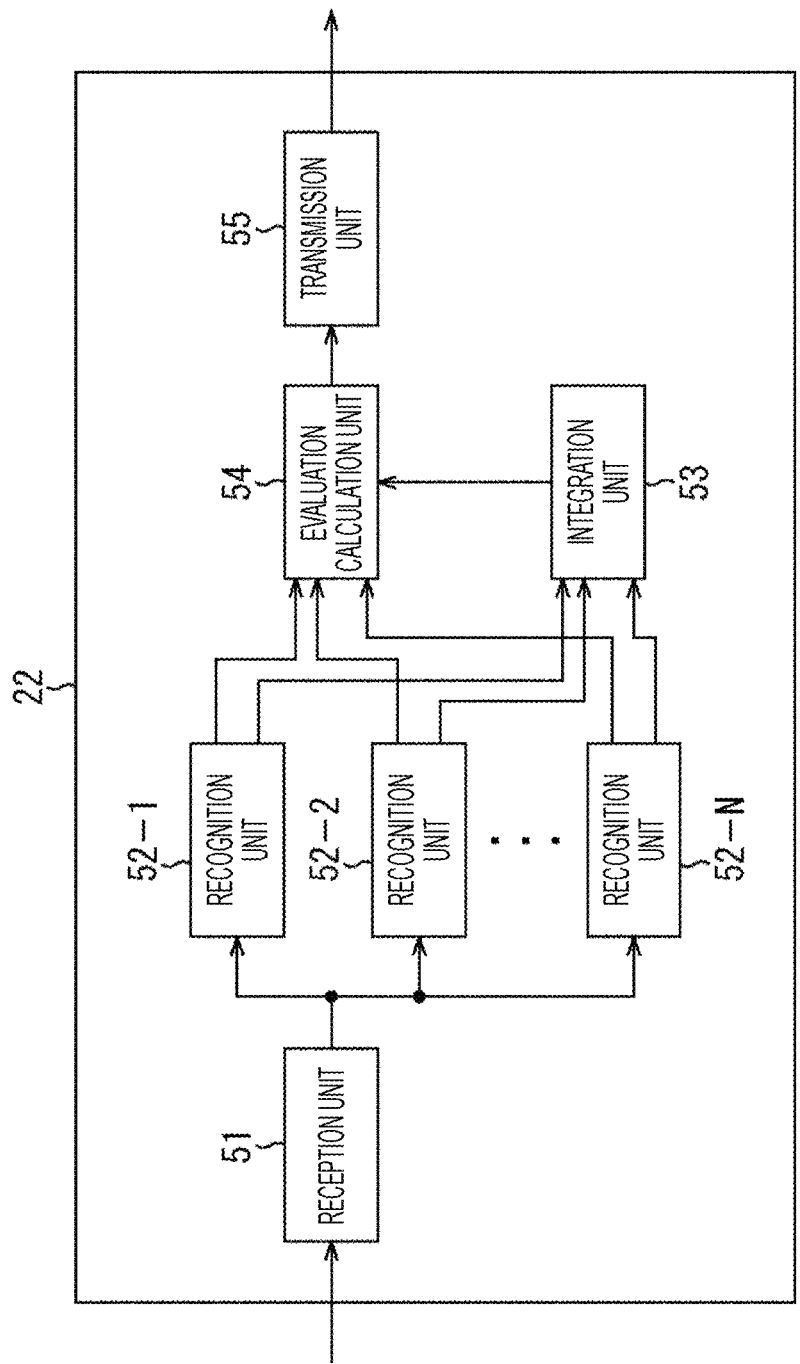
FIG. 7 is a block diagram illustrating a configuration example of an information processing device on the server side.

FIG. 7 is a block diagram illustrating a configuration example of the information processing device 22 included in the server 14.

As illustrated in FIG. 7, the information processing device 22 includes a reception unit 51, N recognition units 52-1 to 52-N, an integration unit 53, an evaluation calculation unit 54, and a transmission unit 55.

The reception unit 51 receives an image, a model, and additional information transmitted from the N vehicles 13-1 to 13-N. Then, the reception unit 51 supplies the models of the recognizers in the N vehicles 13-1 to 13-N to the respectively corresponding recognition units 52-1 to 52-N. Thereafter, the reception unit 51 supplies each of the N images and the N pieces of additional information to all of the recognition units 52-1 to 52-N.

The recognition units 52-1 to 52-N respectively set the models of the N vehicles 13-1 to 13-N. Then, the recognition units 52-1 to 52-N input images obtained by weighting the models with the additional information, and supply the recognition results obtained by performing image recognition to the integration unit 53 and the evaluation calculation unit 54.

The integration unit 53 aggregates the N recognition results supplied from the recognition units 52-1 to 52-N, finds an integrated recognition result by calculating, for example, a weighted average thereof, and supplies the integrated recognition result to the evaluation calculation unit 54.

The evaluation calculation unit 54 uses the integrated recognition result supplied from the integration unit 53 and the recognition results supplied from the recognition units 52-1 to 52-N to calculate evaluation values for individually evaluating the models set for the respective recognition units 52-1 to 52-N, and supplies the evaluation values to the transmission unit 55.

The transmission unit 55 transmits the evaluation values for the models of the individual recognizers supplied from the evaluation calculation unit 54 to the respectively corresponding vehicles 13 among the N vehicles 13-1 to 13-N.

Here, evaluation of the model by the integration unit 53 and the evaluation calculation unit 54 will be described. For example, threshold processing is performed using a load average value that uses a distance.

That is, the integration unit 53 and the evaluation calculation unit 54 can calculate the integrated recognition result $R_{ij}$ and the evaluation value $D_n$ by operating the following expression (1) using the pixel value $I_{n,\,ij}$ of the image recognition result to be evaluated, the pixel value $R_{ij}$ of the image recognition result to be referred, the index set N of the vehicle 13, the index set W of the width of the image, the index set H of the height of the image, and the inter-domain distance $d_n$ calculated using the additional information.

[Expression 1]

$$\begin{cases} R_{ij} = \sum_{n \in N} w_n I_{ij} = \sum_{n \in N} e^{-d_n} I_{ij} \\ D_n = \dfrac{1}{|W||H|} \sum_{i,j \in W,H} |I_{n,ij} - R_{ij}| \end{cases} \quad (1)$$

Furthermore, the inter-domain distance $d_n$ can be calculated on the basis of a rule base, or by using a distance to the center after clustering with additional information.

For example, the inter-domain distance $d_n$ based on the rule base can be found by operating the following expression (2) using the constant a (>0), the direct distance d from the start point, and the difference $b_{car}$ defined in advance for each vehicle type. Here, the difference $b_{car}$ can be comprehensively set from the height of the vehicle body, the attachment position and posture of the image pickup device, the type (resolution and angle of view) of the image pickup device, and the like.

[Expression 2]

$$d_n = a \cdot d + b_{car} \quad (2)$$

In addition, the inter-domain distance $d_n$ based on the rule base can be found by operating the following expression (3) using the constant a (>0), the number of boundaries k, and the difference $b_{car}$ defined in advance for each vehicle type. Here, the boundary in the number of boundaries k can be a unique classification such as a city, a prefecture, or a state across the boundary, for example.

[Expression 3]

$$d_n = a \cdot k + b_{car} \quad (3)$$

Note that the right sides of expressions (2) and (3) all depend on n, but are omitted to simplify the description.

Furthermore, the distance to the center after clustering with the additional information is obtained by, for example, clustering the additional information in various vehicles 13, environments, and the like acquired in the past by the k-means method or the like and calculating the center (centroid) of the cluster in advance. Then, by using the additional information $a_i$ corresponding to the input image and the center $c_n$ of the cluster to which the additional information corresponding to each recognizer belongs, the following expression (4) is operated.

[Expression 4]

$$d_n = \|a_i - c_n\| \quad (4)$$

Then, the inter-domain distance $d_n$ found in this manner is used in the expression (1) described above, so that the integrated recognition result $R_{ij}$ and the evaluation value $D_n$ are calculated.

Furthermore, the evaluation value $D_n$ is transmitted from the server 14 to each of the vehicles 13-1 to 13-N, and the determination unit 36 compares the evaluation value $D_n$ with the evaluation value threshold $D_{thresh,\ n}$ as described above. Then, if the evaluation value $D_n$ is equal to or larger than the evaluation value threshold $D_{thresh,\ n}$, it is determined that learning has been performed correctly.

<Information Processing>

Figure 8:
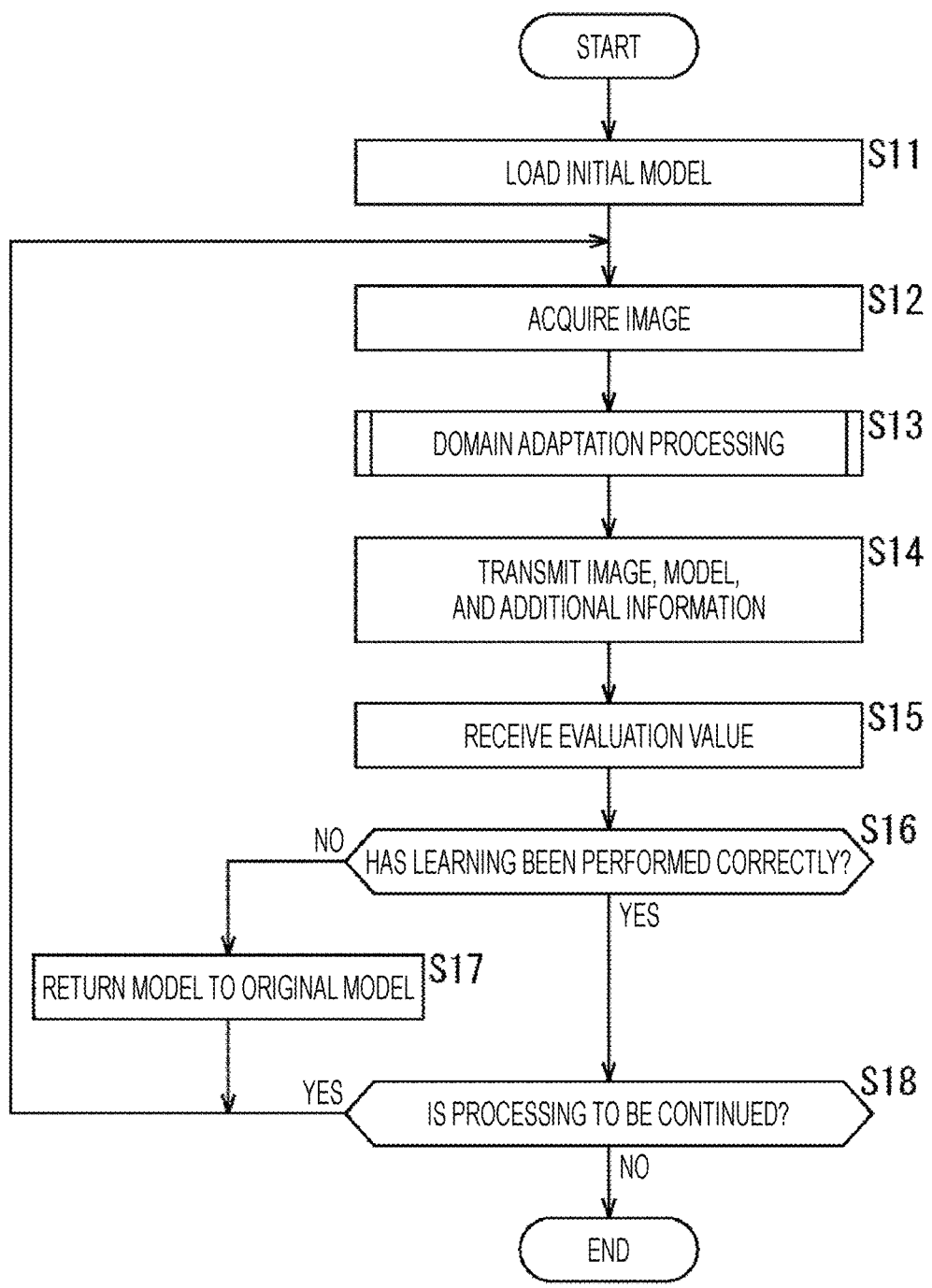
FIG. 8 is a flowchart for explaining information processing to be executed on the vehicle side.

FIG. 8 is a flowchart for explaining information processing on the vehicle 13 side to be executed by the information processing device 21.

For example, when driving of the vehicle 13 is started and image pickup by an image pickup device (not shown) included in the vehicle 13 is started, the processing is started, and the domain adaptation processing execution unit 33 loads the initial model from the storage unit 32 and sets the initial model in the recognizer in step S11.

In step S12, the image acquisition unit 31 acquires an image captured by the image pickup device and supplies the image to the domain adaptation processing execution unit 33.

In step S13, the domain adaptation processing execution unit 33 executes domain adaptation processing (see flowchart in FIG. 9) on the image supplied from the image acquisition unit 31 in step S12, and updates the model set in the recognizer.

In step S14, when it comes to the timing when evaluation and feedback are to be performed in the server 14, the domain adaptation processing execution unit 33 supplies the image and the model to the transmission unit 34, and the transmission unit 34 transmits the image, the model, and the additional information to the server 14.

In step S15, the reception unit 35 receives the evaluation value $D_n$ transmitted as a result of the information processing (see the flowchart in FIG. 10) performed in the server 14, and supplies the evaluation value to the determination unit 36.

In step S16, the determination unit 36 compares the evaluation value $D_n$ supplied from the reception unit 35 in step S15 with the evaluation value threshold $D_{thresh,\ n}$, and determines whether learning has been performed correctly in the domain adaptation processing execution unit 33 or not. For example, the determination unit 36 determines that the learning has been performed correctly if the evaluation value $D_n$ is equal to or larger than the evaluation value threshold $D_{thresh,\ n}$ ($D_n \geq D_{thresh,\ n}$), or determines that the learning has not been performed correctly if the evaluation value $D_n$ is smaller than the evaluation value threshold $D_{thresh,\ n}$ ($D_n < D_{thresh,\ n}$).

In a case where the determination unit 36 determines in step S16 that learning has not been performed correctly in the domain adaptation processing execution unit 33, the processing proceeds to step S17.

In step S17, the determination unit 36 notifies the domain adaptation processing execution unit 33 of the determination result, and the domain adaptation processing execution unit 33 returns the model set in the recognizer to the original model before being updated. Thereafter, the processing returns to step S12, and similar processing is repeatedly performed thereafter.

On the other hand, in a case where the determination unit 36 determines in step S16 that learning has been performed correctly in the domain adaptation processing execution unit 33, the processing proceeds to step S18.

In step S18, the domain adaptation processing execution unit 33 determines whether to continue the information processing of updating the model of the recognizer or not.

In a case where the domain adaptation processing execution unit 33 determines in step S18 to continue the information processing of updating the model of the recognizer, the processing returns to step S12 and similar processing is repeatedly performed thereafter. On the other hand, in a case where the domain adaptation processing execution unit 33 determines in step S18 not to continue the information processing of updating the model of the recognizer, the processing is terminated.

As described above, the information processing device 21 can determine whether the model of the recognizer updated by performing the domain adaptation processing is learned correctly or not on the basis of the evaluation value from the server 14. Therefore, more accurate determination can be made than determining whether the information processing device 21 alone performs learning correctly or not, and the recognition performance can be improved.

Figure 9:
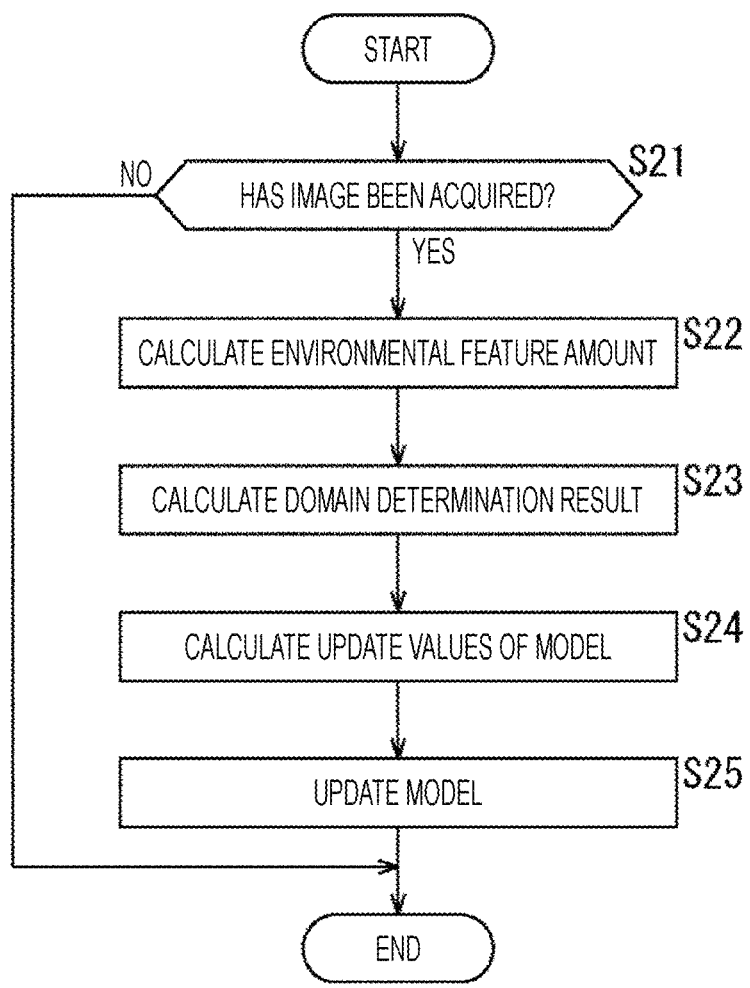
FIG. 9 is a flowchart for explaining domain adaptation processing.

FIG. 9 is a flowchart for explaining the domain adaptation processing to be performed in step S13 of FIG. 8.

In step S21, the domain adaptation processing execution unit 33 determines whether an image from the image acquisition unit 31 has been acquired or not, and terminates the processing in a case where it is determined that an image has not been acquired. Then, in a case where it is determined in step S21 that an image has been acquired, the processing proceeds to step S22.

In step S22, the environmental feature amount calculation unit 41 calculates an environmental feature amount indicating the feature of each pixel from the acquired image by using a predetermined coefficient, and supplies the environmental feature amount to the domain determination unit 42.

In step S23, the domain determination unit 42 classifies the environmental feature amount supplied from the environmental feature amount calculation unit 41 in step S22 according to a predetermined threshold, performs domain determination to determine a region including pixels indicating the environmental feature amount classified by the threshold as one domain, and supplies the domain determination result obtained as a result to the update value calculation unit 43.

In step S24, the update value calculation unit 43 calculates an environmental feature amount calculation update value for updating a coefficient used for calculation of an environment feature amount in the environmental feature amount calculation unit 41, and a domain determination update value for updating a threshold used for domain determination in the domain determination unit 42 according to the domain determination result supplied from the domain determination unit 42 in step S23.

In step S25, the update value calculation unit 43 feeds back the environmental feature amount calculation update value to the environmental feature amount calculation unit 41, and feeds back the domain determination update value to the domain determination unit 42. Therefore, after the model of the recognizer configured with the environmental feature amount calculation unit 41 and the domain determination unit 42 is updated, the processing is terminated.

Figure 10:
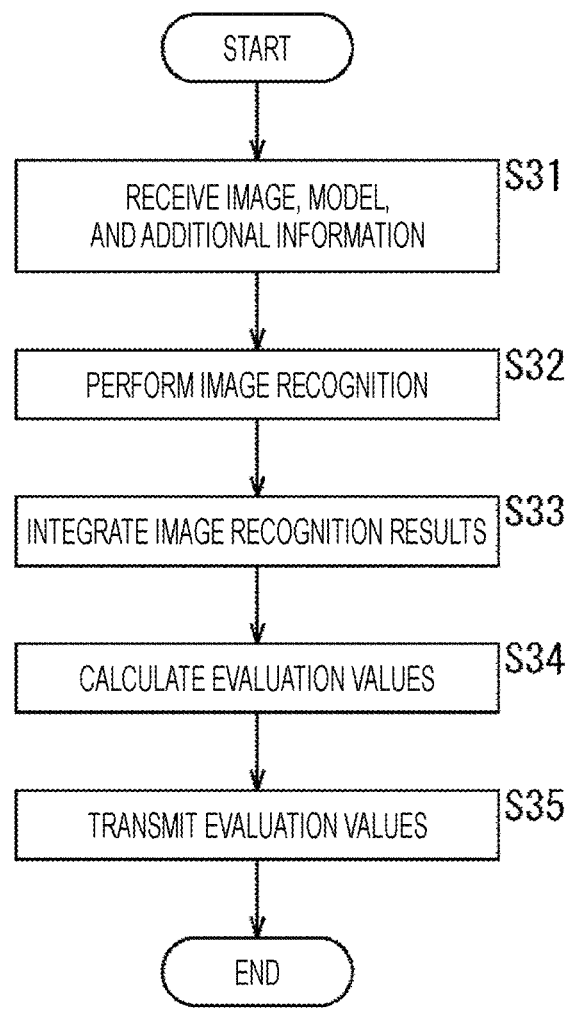
FIG. 10 is a flowchart for explaining information processing to be executed on the server side.

FIG. 10 is a flowchart for explaining information processing on the server 14 side to be executed by the information processing device 22.

In step S31, the reception unit 51 receives an image, a model, and additional information transmitted in step S14 of FIG. 8 by the N vehicles 13-1 to 13-N. Then, the reception unit 51 supplies the models of the recognizers in the N vehicles 13-1 to 13-N to the respectively corresponding recognition units 52-1 to 52-N, and supplies the N images and the N pieces of additional information respectively to all the recognition units 52-1 to 52-N.

In step S32, the recognition units 52-1 to 52-N respectively set the models of the N vehicles 13-1 to 13-N, and perform image recognition on the images weighted with the additional information. Then, the recognition units 52-1 to 52-N supply the recognition results obtained by performing image recognition to the integration unit 53 and the evaluation calculation unit 54.

In step S33, the integration unit 53 finds an integrated recognition result $R_{ij}$ from the N recognition results supplied from the recognition units 52-1 to 52-N in step S32, and supplies the integrated recognition result to the evaluation calculation unit 54.

In step S34, the evaluation calculation unit 54 uses the integrated recognition result $R_{ij}$ supplied from the integration unit 53 in step S33, and the recognition results supplied from the recognition units 52-1 to 52-N in step S32 to calculate evaluation values $D_n$ for individually evaluating the models set for the respective recognition units 52-1 to 52-N. Then, the evaluation calculation unit 54 supplies the evaluation values $D_n$ to the transmission unit 55.

In step S35, the transmission unit 55 transmits the evaluation values $D_n$ supplied from the evaluation calculation unit 54 in step S34 to the corresponding vehicle 13-$n$ among the N vehicles 13-1 to 13-N. Then, after the transmission unit 55 transmits the evaluation values $D_n$ to the respective N vehicles 13-1 to 13-N, the processing is terminated.

As described above, the information processing device 22 can comprehensively evaluate the models set for the recognition units 52-1 to 52-N by using the integrated recognition result obtained by integrating the recognition results obtained in the recognition units 52-1 to 52-N.

Configuration Example of Computer

Next, a series of processing (information processing method) described above can be performed by hardware or software. In a case where the series of processing is performed by software, a program constituting the software is installed into a general-purpose computer or the like.

Figure 11:
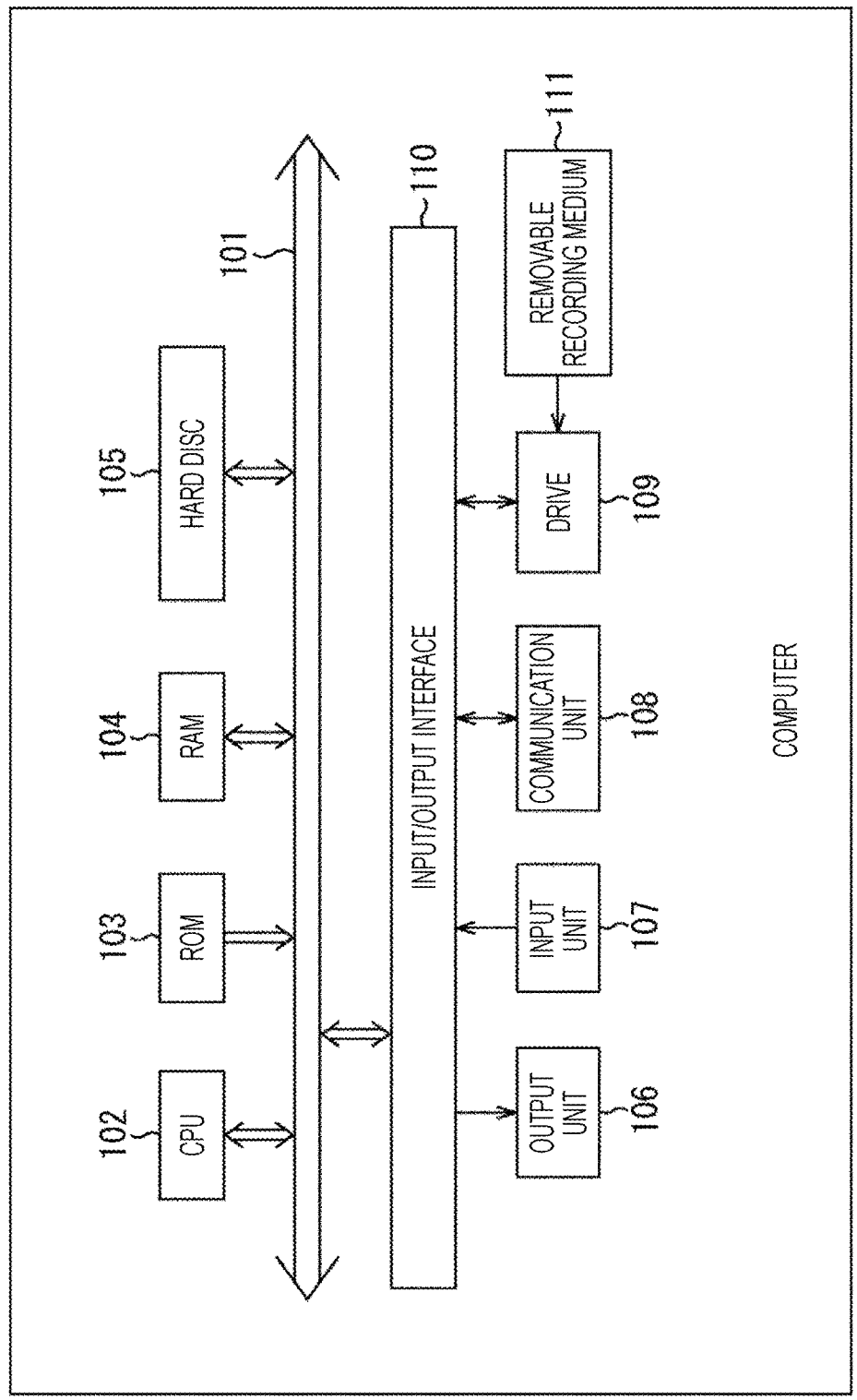
FIG. 11 is a block diagram illustrating a configuration example of an embodiment of a computer to which the present technology is applied.

FIG. 11 is a block diagram illustrating a configuration example of an embodiment of a computer into which a program for executing the series of processing described above is installed.

The program can be recorded in advance in a hard disc 105 or a ROM 103 as a recording medium built in the computer.

Alternatively, the program can be stored (recorded) in a removable recording medium 111 driven by a drive 109. Such a removable recording medium 111 can be provided as so-called package software. Here, examples of the removable recording medium 111 include a flexible disc, a compact disc read only memory (CD-ROM), a magneto optical (MO) disc, a digital versatile disc (DVD), a magnetic disc, a semiconductor memory, and the like.

Note that the program can be installed into the computer from the removable recording medium 111 as described above, or can be downloaded to the computer via a communication network or a broadcast network and installed into the built-in hard disc 105. That is, for example, the program can be wirelessly transferred from a download site to the computer via an artificial satellite for digital satellite broadcasting, or can be transferred by wire to the computer via a network such as a local area network (LAN) or the Internet.

The computer has a central processing unit (CPU) 102 built therein, and the CPU 102 is connected with an input/output interface 110 via a bus 101.

When a command is inputted by a user via the input/output interface 110 by operating an input unit 107 or the like, the CPU 102 executes a program stored in the read only memory (ROM) 103 according to the command. Alternatively, the CPU 102 loads the program stored in the hard disc 105 into a random access memory (RAM) 104 and executes the program.

Therefore, the CPU 102 performs the processing according to the flowchart described above or the processing performed by the configuration in the block diagram described above. Then, the CPU 102 outputs the processing result from an output unit 106, transmits the processing result from a communication unit 108, or records the processing result in the hard disc 105 via the input/output interface 110, for example, as necessary.

Note that the input unit 107 includes a keyboard, a mouse, a microphone, and the like. Furthermore, the output unit 106 includes a liquid crystal display (LCD), a speaker, and the like.

Here, in the present specification, the processing performed by the computer according to the program is not necessarily performed in time series in the order described as the flowchart. That is, the processing performed by the computer according to the program also includes processing executed in parallel or individually (e.g., parallel processing or processing by an object).

Furthermore, the program may be processed by one computer (processor) or may be processed in a distributed manner by a plurality of computers. Moreover, the program may be transferred to a remote computer and executed.

Moreover, in the present specification, a system means a set of a plurality of components (devices, modules (parts), etc.), and it does not matter whether all the components are in the same housing or not. Accordingly, a plurality of devices housed in separate housings and connected via a network, and one device in which a plurality of modules is housed in one housing are both systems.

Furthermore, for example, a configuration described as one device (or processing unit) may be divided and configured as a plurality of devices (or processing units). Conversely, configurations described above as a plurality of devices (or processing units) may be collectively configured as one device (or processing unit). Furthermore, a configuration other than the configuration described above may be of course added to the configuration of each device (or each processing unit). Moreover, a part of the configuration of a certain device (or processing unit) may be included in the configuration of another device (or another processing unit) as long as the configuration or operation of the entire system is substantially the same.

Furthermore, for example, the present technology can have a configuration of cloud computing in which one function is shared and processed in cooperation by a plurality of devices via a network.

Furthermore, for example, the program described above can be executed in an arbitrary device. In that case, the device is only required to have a necessary function (functional block, etc.) so that necessary information can be obtained.

Furthermore, for example, each step described in the flowchart described above can be executed by one device or can be shared and executed by a plurality of devices. Moreover, in a case where a plurality of processes is included in one step, the plurality of processes included in the one step can be executed by one device or can be shared and executed by a plurality of devices. In other words, a plurality of processes included in one step can also be executed as processes of a plurality of steps. Conversely, processes described as a plurality of steps can be collectively executed as one step.

Note that, in the program executed by the computer, processing of steps describing the program may be executed in time series in the order described herein, or may be executed in parallel, or individually at a necessary timing such as when a call is made. That is, the processes of the steps may be executed in an order different from the order described above, as long as there is no contradiction. Moreover, the processing of steps describing this program may be executed in parallel with the processing of another program, or may be executed in combination with the processing of another program.

Note that a plurality of the present technologies described herein can be implemented independently as a single body, as long as there is no contradiction. Of course, a plurality of arbitrary present technologies can be implemented in combination. For example, some or all of the present technology described in any of the embodiments can be implemented in combination with some or all of the present technology described in other embodiments. Furthermore, some or all of arbitrary present technologies described above can be implemented in combination with other technologies not described above.

Application Example

The technology according to the present disclosure can be applied to various products. For example, the technology according to the present disclosure may be realized as a device mounted on any type of mobile body such as an automobile, an electric vehicle, a hybrid electric vehicle, a motorcycle, a bicycle, a personal mobility, an airplane, a drone, a ship, a robot, a construction machine, or an agricultural machine (tractor).

Figure 12:
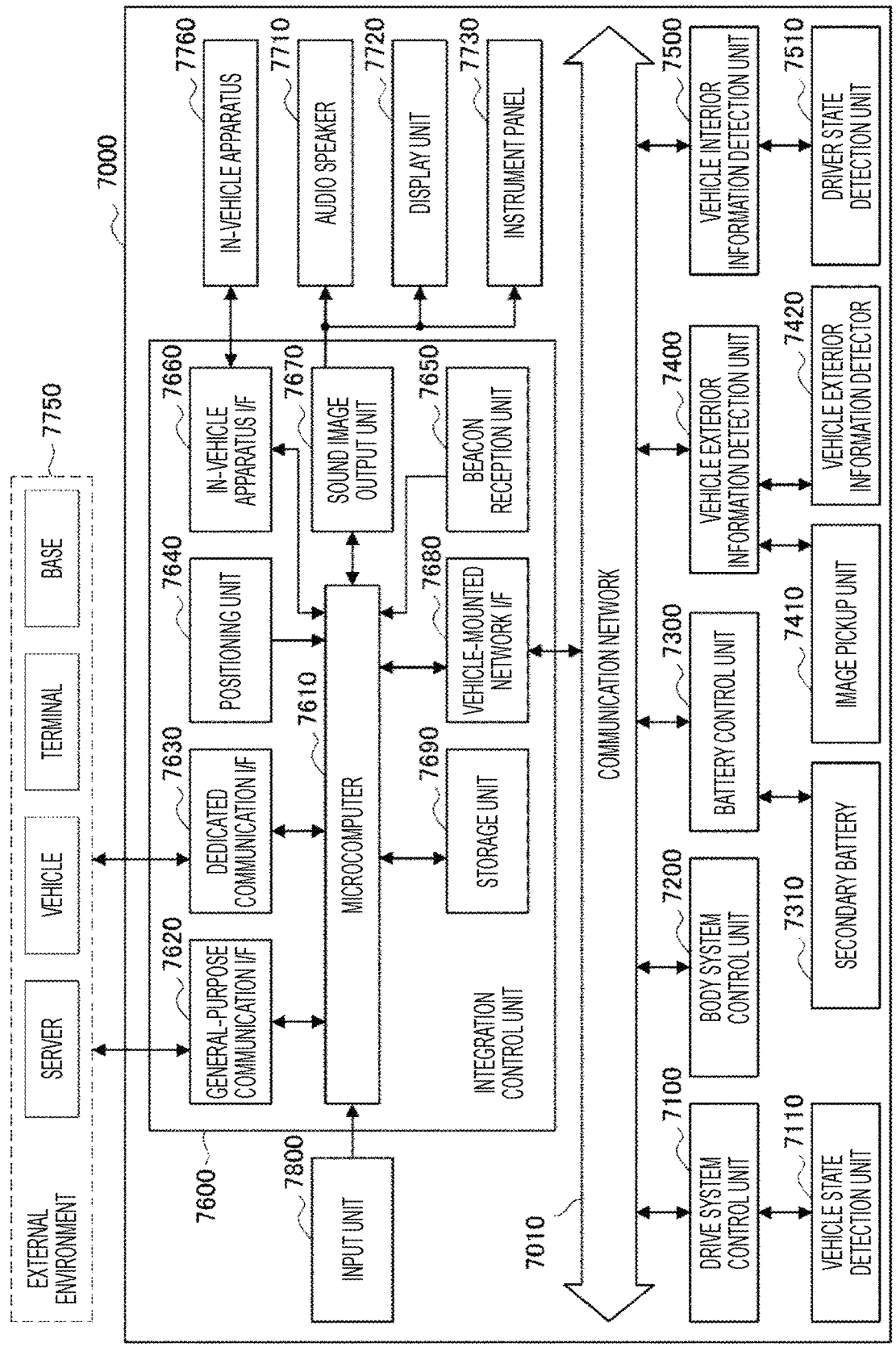
FIG. 12 is a block diagram illustrating an example of schematic configuration of a vehicle control system.

FIG. 12 is a block diagram illustrating a schematic configuration example of a vehicle control system 7000 that is an example of a mobile body control system to which the present technology can be applied. The vehicle control system 7000 includes a plurality of electronic control units connected via a communication network 7010. In the example illustrated in FIG. 12, the vehicle control system 7000 includes a drive system control unit 7100, a body system control unit 7200, a battery control unit 7300, a vehicle exterior information detection unit 7400, a vehicle interior information detection unit 7500, and an integration control unit 7600. The communication network 7010 that connects these plurality of control units may be, for example, a vehicle-mounted communication network compliant with an arbitrary standard such as a controller area network (CAN), a local interconnect network (LIN), a local area network (LAN), or the FlexRay (registered trademark).

Each control unit includes a microcomputer that performs arithmetic processing according to various programs, a storage unit that stores a program to be executed by the microcomputer, parameters used for various operations, or the like, and a drive circuit that drives various devices to be controlled. Each control unit includes a network I/F for communicating with other control units via the communication network 7010, and includes a communication I/F for communicating with devices, sensors, or the like inside or outside the vehicle by wired communication or wireless communication. In FIG. 12, a microcomputer 7610, a general-purpose communication I/F 7620, a dedicated communication I/F 7630, a positioning unit 7640, a beacon reception unit 7650, an in-vehicle apparatus I/F 7660, a sound image output unit 7670, a vehicle-mounted network I/F 7680, and a storage unit 7690 are illustrated as a functional configuration of the integration control unit 7600. The other control units similarly each include a microcomputer, a communication I/F, a storage unit, and the like.

The drive system control unit 7100 controls the operation of devices related to the drive system of the vehicle according to various programs. For example, the drive system control unit 7100 functions as a driving force generation device for generating driving force of a vehicle such as an internal combustion engine or a driving motor, a driving force transmission mechanism for transmitting the driving force to the wheels, a steering mechanism for adjusting the steering angle of the vehicle, and a control device such as a braking device for generating braking force of the vehicle. The drive system control unit 7100 may have a function as a control device such as an antilock brake system (ABS) or an electronic stability control (ESC).

The drive system control unit 7100 is connected with a vehicle state detection unit 7110. The vehicle state detection unit 7110 includes, for example, at least one of a gyro sensor that detects the angular velocity of axial rotational motion of a vehicle body, an acceleration sensor that detects the acceleration of the vehicle, or a sensor for detecting the operation amount of an accelerator pedal, the operation amount of a brake pedal, the steering angle of a steering wheel, the engine speed, the rotation speed of the wheels, or the like. The drive system control unit 7100 performs arithmetic processing using a signal inputted from the vehicle state detection unit 7110, and controls an internal combustion engine, a driving motor, an electric power steering device, a brake device, or the like.

The body system control unit 7200 controls the operation of various devices mounted on the vehicle body according to various programs. For example, the body system control unit 7200 functions as a control device for a keyless entry system, a smart key system, a power window device, or various lamps such as a head lamp, a back lamp, a brake lamp, a blinker, or a fog lamp. In this case, radio waves sent from a portable device that substitutes for a key or signals of various switches can be inputted to the body system control unit 7200. The body system control unit 7200 accepts input of these radio waves or signals, and controls a door lock device, a power window device, a lamp, and the like of the vehicle.

The battery control unit 7300 controls a secondary battery 7310, which is a power supply source of the driving motor, according to various programs. For example, information such as a battery temperature, a battery output voltage, or a remaining capacity of a battery is inputted to the battery control unit 7300 from a battery device including the secondary battery 7310. The battery control unit 7300 performs arithmetic processing using these signals, and performs temperature adjustment control of the secondary battery 7310, or control of a cooling device or the like included in the battery device.

The vehicle exterior information detection unit 7400 detects information of the outside the vehicle on which the vehicle control system 7000 is mounted. For example, the vehicle exterior information detection unit 7400 is connected with at least one of an image pickup unit 7410 or a vehicle exterior information detector 7420. The image pickup unit 7410 includes at least one of a time of flight (ToF) camera, a stereo camera, a monocular camera, an infrared camera, or another camera. The vehicle exterior information detector 7420 includes, for example, at least one of an environment sensor for detecting current climate or weather, or a surrounding information detection sensor for detecting another vehicle, an obstacle, a pedestrian, or the like around the vehicle on which the vehicle control system 7000 is mounted.

The environment sensor may be, for example, at least one of a raindrop sensor that detects rainy weather, a fog sensor that detects fog, a sunshine sensor that detects the degree of sunshine, or a snow sensor that detects snowfall. The surrounding information detection sensor may be, for example, at least one of an ultrasonic sensor, a radar device, or a light detection and ranging (LIDAR, Laser Imaging Detection and Ranging) device. The image pickup unit 7410 and the vehicle exterior information detector 7420 may be provided as independent sensors or devices, or may be provided as a device in which a plurality of sensors or devices is integrated.

Figure 13:
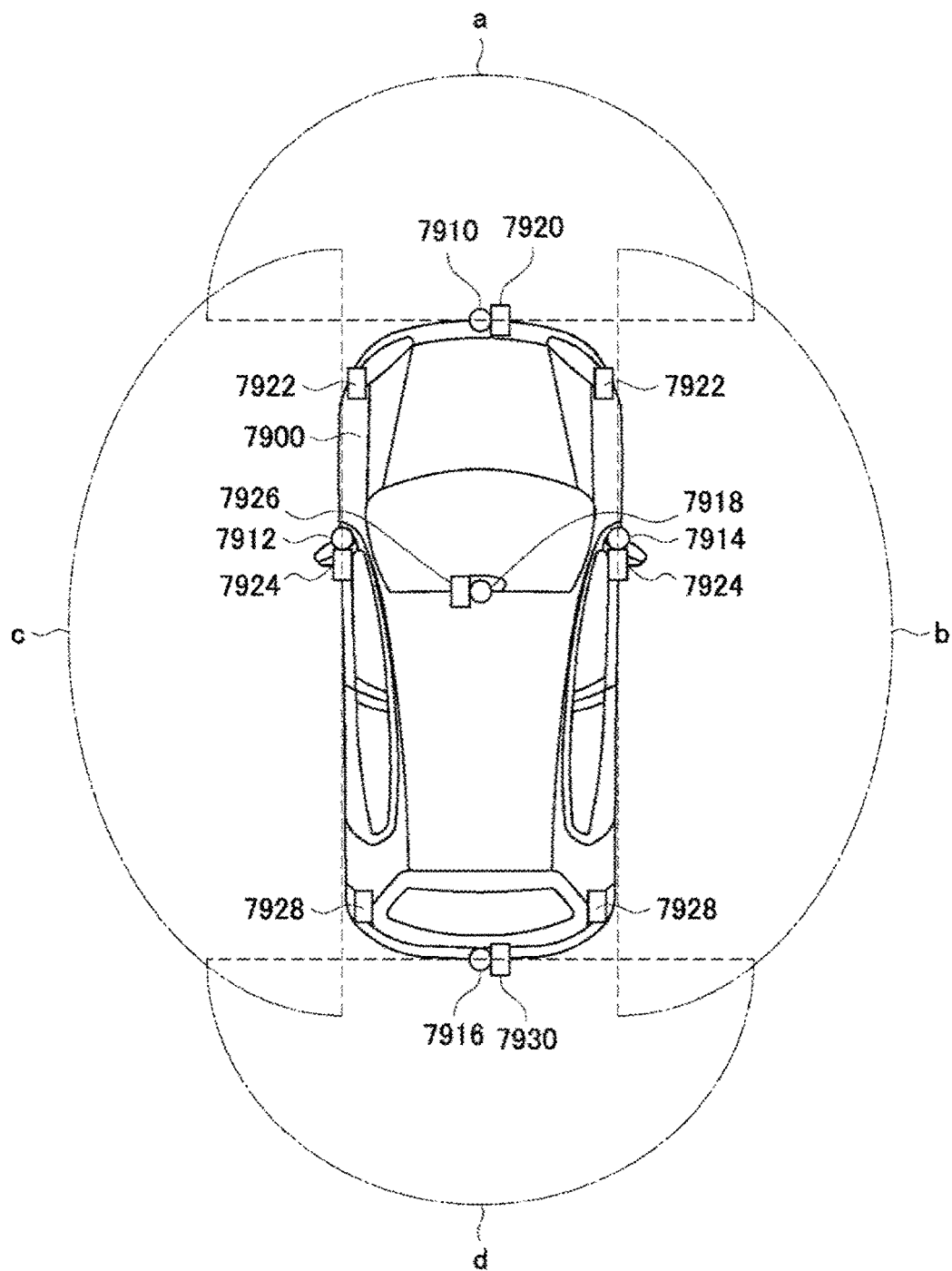
FIG. 13 is an explanatory diagram illustrating an example of installation positions of a vehicle exterior information detection unit and an image pickup unit.

Here, FIG. 13 illustrates an example of installation positions of the image pickup unit 7410 and the vehicle exterior information detector 7420. Image pickup units 7910, 7912, 7914, 7916, and 7918 are provided at, for example, at least one position of a front nose, a side mirror, a rear bumper, a back door, or an upper part of a windshield in a vehicle interior of a vehicle 7900. The image pickup unit 7910 provided at the front nose and the image pickup unit 7918 provided on the upper part of the windshield in the vehicle interior mainly acquire images in front of the vehicle 7900. The image pickup units 7912 and 7914 provided on the side mirror mainly acquire images of the sides of the vehicle 7900. The image pickup unit 7916 provided on the rear bumper or the back door mainly acquires images behind the vehicle 7900. The image pickup unit 7918 provided on the upper part of the windshield in the vehicle interior is mainly used to detect a preceding vehicle, a pedestrian, an obstacle, a traffic light, a traffic sign, a lane, or the like.

Note that FIG. 13 illustrates an example of imaging ranges of the respective image pickup units 7910, 7912, 7914, and 7916. The image pickup range a indicates an image pickup range of the image pickup unit 7910 provided at the front nose, the image pickup ranges b and c indicate image pickup ranges of the image pickup units 7912 and 7914 respectively provided at the side mirrors, and the image pickup range d indicates an image pickup range of the image pickup unit 7916 provided at the rear bumper or the back door. For example, an overhead view image of the vehicle 7900 viewed from above can be obtained by superimposing image data captured by the image pickup units 7910, 7912, 7914, and 7916.

Vehicle exterior information detection units 7920, 7922, 7924, 7926, 7928, and 7930 provided at the front, rear, sides, and corners, and on the upper part of the windshield in the vehicle interior of the vehicle 7900 may be, for example, ultrasonic sensors or radar devices. The vehicle exterior information detection units 7920, 7926, and 7930 provided on the front nose, the rear bumper, the back door, and the upper part of the windshield in the vehicle interior of the vehicle 7900 may be, for example, LIDAR devices. These vehicle exterior information detection units 7920 to 7930 are mainly used for detecting a preceding vehicle, a pedestrian, an obstacle, or the like.

The description will be continued returning to FIG. 12. The vehicle exterior information detection unit 7400 causes the image pickup unit 7410 to capture an image of the outside of the vehicle, and receives the captured image data. Furthermore, the vehicle exterior information detection unit 7400 receives detection information from the connected vehicle exterior information detector 7420. In a case where the vehicle exterior information detector 7420 is an ultrasonic sensor, a radar device, or a LIDAR device, the vehicle exterior information detection unit 7400 sends ultrasonic waves, electromagnetic waves, or the like, and receives information of received reflected waves. The vehicle exterior information detection unit 7400 may perform object detection processing or distance detection processing of a person, a car, an obstacle, a traffic sign, a character on a road surface, or the like on the basis of the received information. The vehicle exterior information detection unit 7400 may perform environment recognition processing of recognizing rainfall, fog, road surface conditions, or the like on the basis of the received information. The vehicle exterior information detection unit 7400 may calculate a distance to an object outside the vehicle on the basis of the received information.

Furthermore, the vehicle exterior information detection unit 7400 may perform image recognition processing or distance detection processing of recognizing a person, a car, an obstacle, a traffic sign, a character on a road surface, or the like on the basis of the received image data. The vehicle exterior information detection unit 7400 may perform processing such as distortion correction or alignment on the received image data, and combine image data captured by different image pickup units 7410 to generate an overhead view image or a panoramic image. The vehicle exterior information detection unit 7400 may perform viewpoint conversion processing using image data captured by different image pickup units 7410.

The vehicle interior information detection unit 7500 detects information on the inside of the vehicle. The vehicle interior information detection unit 7500 is connected with, for example, a driver state detection unit 7510 that detects the state of a driver. The driver state detection unit 7510 may include a camera that captures an image of the driver, a biosensor that detects biological information of the driver, a microphone that collects sound in the vehicle interior, or the like. The biosensor is provided on, for example, a seat surface, a steering wheel, or the like, and detects biological information of an occupant sitting on the seat or a driver who holds the steering wheel. The vehicle interior information detection unit 7500 may calculate the degree of fatigue or the degree of concentration of the driver or may determine whether the driver is dozing or not on the basis of the detection information inputted from the driver state detection unit 7510. The vehicle interior information detection unit 7500 may perform processing such as noise canceling processing on the collected sound signal.

The integration control unit 7600 controls the overall operation in the vehicle control system 7000 according to various programs. The integration control unit 7600 is connected with an input unit 7800. The input unit 7800 is realized by, for example, a device such as a touch panel, a button, a microphone, a switch, or a lever that can be operated by an occupant for input. Data obtained by performing sound recognition on the sound inputted through the microphone may be inputted to the integration control unit 7600. The input unit 7800 may be, for example, a remote control device that uses infrared rays or other radio waves, or may be an external connection device such as a mobile phone or a personal digital assistant (PDA) corresponding to the operation of the vehicle control system 7000. The input unit 7800 may be, for example, a camera, and in this case, the occupant can input information by gesture. Alternatively, data obtained by detecting the movement of the wearable device worn by the occupant may be inputted. Moreover, the input unit 7800 may include, for example, an input control circuit or the like that generates an input signal on the basis of information inputted by the occupant or the like using the input unit 7800 described above and outputs the input signal to the integration control unit 7600. By operating the input unit 7800, the occupant or the like inputs various data to the vehicle control system 7000 or gives an instruction on a processing operation.

The storage unit 7690 may include a read only memory (ROM) that stores various programs to be executed by the microcomputer, and a random access memory (RAM) that stores various parameters, operation results, sensor values, or the like. Furthermore, the storage unit 7690 may be realized by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various apparatuses existing in an external environment 7750. A cellular communication protocol such as the Global System of Mobile communications (GSM) (registered trademark), the WiMAX (registered trademark), the Long Term Evolution (LTE) (registered trademark), or LTE-Advanced (LTE-A), or another wireless communication protocol such as a wireless LAN (also referred to as Wi-Fi (registered trademark)) or the Bluetooth (registered trademark) may be mounted on the general-purpose communication I/F 7620. For example, the general-purpose communication I/F 7620 may be connected with an apparatus (e.g., application server or control server) existing on an external network (e.g., Internet, cloud network, or network unique to business operator) via a base station or an access point. Furthermore, for example, the general-purpose communication I/F 7620 may be connected with a terminal (e.g., terminal of driver, pedestrian, or store, or machine type communication (MTC) terminal) existing in the vicinity of the vehicle by using peer to peer (P2P) technology.

The dedicated communication I/F 7630 is a communication I/F that supports a communication protocol formulated for use in a vehicle. For example, a standard protocol such as wireless access in vehicle environment (WAVE) which is a combination of IEEE 802.11p of the low-order layer and IEEE 1609 of the high-order layer, dedicated short range communications (DSRC), or a cellular communication protocol may be mounted on the dedicated communication I/F 7630. Typically, the dedicated communication I/F 7630 carries out V2X communication, which is a concept including at least one of vehicle to vehicle communication, vehicle to infrastructure communication, vehicle to home communication, or vehicle to pedestrian communication.

The positioning unit 7640 receives, for example, a global navigation satellite system (GNSS) signal from a GNSS satellite (e.g., global positioning system (GPS) signal from GPS satellite), executes positioning, and generates position information including the latitude, longitude, and altitude of the vehicle. Note that the positioning unit 7640 may specify the current position by exchanging signals with a wireless access point, or may acquire the position information from a terminal such as a mobile phone, a PHS, or a smartphone having a positioning function.

For example, the beacon reception unit 7650 receives radio waves or electromagnetic waves sent from a wireless station or the like installed on the road, and acquires information such as the current position, traffic congestions, road closure, or required time. Note that the function of the beacon reception unit 7650 may be included in the dedicated communication I/F 7630 described above.

The in-vehicle apparatus I/F 7660 is a communication interface that mediates connection between the microcomputer 7610 and various in-vehicle apparatuses 7760 existing in the vehicle. The in-vehicle apparatus I/F 7660 may establish wireless connection using a wireless communication protocol such as wireless LAN, the Bluetooth (registered trademark), near field communication (NFC), or wireless USB (WUSB). Furthermore, the in-vehicle apparatus I/F 7660 may establish wired communication such as a universal serial bus (USB), a high-definition multimedia interface (HDMI) (registered trademark), or mobile high-definition link (MHL) via a connection terminal (and a cable if necessary) (not shown). The in-vehicle apparatus 7760 may include, for example, at least one of a mobile apparatus or a wearable apparatus possessed by an occupant, or an information apparatus carried in or attached to the vehicle. Furthermore, the in-vehicle apparatus 7760 may include a navigation device that searches for a route to an arbitrary destination. The in-vehicle apparatus I/F 7660 exchanges a control signal or a data signal with these in-vehicle apparatuses 7760.

The vehicle-mounted network I/F 7680 is an interface that mediates communication between the microcomputer 7610 and the communication network 7010. The vehicle-mounted network I/F 7680 transmits and receives signals and the like according to a predetermined protocol supported by the communication network 7010.

The microcomputer 7610 of the integration control unit 7600 controls the vehicle control system 7000 according to various programs on the basis of information acquired via at least one of the general-purpose communication I/F 7620, the dedicated communication I/F 7630, the positioning unit 7640, the beacon reception unit 7650, the in-vehicle apparatus I/F 7660, or the vehicle-mounted network I/F 7680. For example, the microcomputer 7610 may operate a control target value of the driving force generation device, the steering mechanism, or the braking device on the basis of the acquired information on the inside and outside of the vehicle, and output a control command to the drive system control unit 7100. For example, the microcomputer 7610 may perform cooperative control aimed at realization of the function of an advanced driver assistance system (ADAS) including collision avoidance or shock mitigation of the vehicle, follow-up traveling based on an inter-vehicle distance, vehicle speed maintenance traveling, collision warning of the vehicle, lane departure warning of the vehicle, or the like. Furthermore, the microcomputer 7610 may perform cooperative control for the purpose of automatic driving or the like in which the vehicle autonomously travels without depending on the operation of the driver by controlling the driving force generation device, the steering mechanism, the braking device, or the like on the basis of the acquired information on the surrounding of the vehicle.

The microcomputer 7610 may generate three-dimensional distance information between the vehicle and an object such as a surrounding structure or person on the basis of information acquired via at least one of the general-purpose communication I/F 7620, the dedicated communication I/F 7630, the positioning unit 7640, the beacon reception unit 7650, the in-vehicle apparatus I/F 7660, or the vehicle-mounted network I/F 7680, and create local map information including surrounding information of the current position of the vehicle. Furthermore, the microcomputer 7610 may predict danger such as collision of the vehicle, approach of a pedestrian or the like, or entry into a closed road on the basis of the acquired information, and generate a warning signal. The warning signal may be, for example, a signal for generating a warning sound or turning on a warning lamp.

The sound image output unit 7670 transmits at least one output signal of a sound or an image to an output device capable of visually or aurally notifying an occupant of the vehicle or the outside of the vehicle of information. In the example of FIG. 12, an audio speaker 7710, a display unit 7720, and an instrument panel 7730 are illustrated as the output device. The display unit 7720 may include, for example, at least one of an on-board display or a head-up display. The display unit 7720 may have an augmented reality (AR) display function. The output device may be a device other than these devices, such as a wearable device such as a headphone or an eyeglass-type display worn by an occupant, a projector, or a lamp. In a case where the output device is a display device, the display device visually displays results obtained by various processes performed by the microcomputer 7610 or information received from another control unit in various forms such as text, images, tables, and graphs. Furthermore, in a case where the output device is a sound output device, the sound output device converts an audio signal including reproduced sound data, acoustic data, or the like into an analog signal and aurally outputs the analog signal.

In the example illustrated in FIG. 12, note that at least two control units connected via the communication network 7010 may be integrated as one control unit. Alternatively, each control unit may include a plurality of control units. Moreover, the vehicle control system 7000 may include another control unit (not shown). Furthermore, in the above description, some or all of the functions performed by any of the control units may be provided in another control unit. That is, predetermined arithmetic processing may be performed by any control unit as long as information is transmitted and received via the communication network 7010. Similarly, a sensor or a device connected with any control unit may be connected with another control unit, and a plurality of control units may mutually transmit and receive detection information via the communication network 7010.

Note that a computer program for realizing each function of the information processing device 21 according to the present embodiment described with reference to FIG. 5 can be mounted on any control unit or the like. Furthermore, it is also possible to provide a computer-readable recording medium storing such a computer program. The recording medium is, for example, a magnetic disc, an optical disc, a magneto-optical disc, a flash memory, or the like. Furthermore, the computer program described above may be distributed via, for example, a network without using a recording medium.

In the vehicle control system 7000 described above, the information processing device 21 according to the present embodiment described with reference to FIG. 5 can be applied to the integration control unit 7600 of the application example illustrated in FIG. 12. For example, the image acquisition unit 31, the domain adaptation processing execution unit 33, the determination unit 36, and the recognition processing unit 37 of the information processing device 21 correspond to the microcomputer 7610 of the integration control unit 7600. Furthermore, for example, the storage unit 32 of the information processing device 21 corresponds to the storage unit 7690 of the integration control unit 7600, and the transmission unit 34 and the reception unit 35 of the information processing device 21 correspond to the vehicle-mounted network I/F 7680 of the integration control unit 7600. For example, the integration control unit 7600 can update the model of the recognizer by executing domain adaptation processing.

Furthermore, at least some of the components of the information processing device 21 described with reference to FIG. 5 may be realized in a module (e.g., integrated circuit module including one die) for the integration control unit 7600 illustrated in FIG. 12. Alternatively, they may be realized by the information processing device 21 described with reference to FIG. 5 and a plurality of control units of the vehicle control system 7000 illustrated in FIG. 12.

Combination Example of Configurations

Note that the present technology can have the following configurations.

(1)

An information processing device including:

a predetermined number of recognition units, for which a model updated by performing image recognition in a predetermined number of terminals and executing unsupervised learning is each set, configured to perform image recognition on an image, on which image recognition has been performed in a predetermined number of the terminals; and an evaluation value calculation unit configured to evaluate recognition results obtained in a predetermined number of the recognition units and calculate an evaluation value for each of the recognition units.

(2)

The information processing device according to (1), in which the learning is performed at timings with a predetermined interval at which the images are acquired in a predetermined number of terminals, and the evaluation value calculation unit calculates the evaluation value at every constant period longer than the predetermined interval.

(3)

The information processing device according to (1) or (2), further including an integration unit that finds an integrated recognition result in which recognition results obtained in a predetermined number of the recognition units are integrated, in which the evaluation value calculation unit calculates an evaluation value of each of the recognition units by using recognition results obtained in a predetermined number of the recognition units and the integrated recognition result.

(4)

The information processing device according to any one of (1) to (3), in which a predetermined number of the recognition units perform image recognition on all images on which image recognition has been performed in a predetermined number of the terminals.

(5)

The information processing device according to (4), in which a predetermined number of the recognition units perform image recognition on an image obtained by weighting the image of a predetermined terminal with additional information transmitted from the terminal.

(6)

The information processing device according to (5), further including a reception unit that receives the image, the model, and the additional information transmitted from a predetermined number of the terminals, in which the reception unit sets the models of a predetermined number of the terminals to a predetermined number of respectively corresponding recognition units, and supplies a predetermined number of the images and a predetermined number of pieces of the additional information to all of a predetermined number of the recognition units.

(7)

The information processing device according to any one of (1) to (6), further including
a transmission unit that transmits evaluation values for the models set in a predetermined number of the recognition units calculated by the evaluation value calculation unit to a predetermined number of respectively corresponding terminals.

(8)

An information processing method including:
by an information processing device,
performing image recognition on an image, on which image recognition has been performed in a predetermined number of terminals, in a predetermined number recognition units for which a model updated by performing image recognition in a predetermined number of the terminals and executing unsupervised learning is each set; and
evaluating recognition results obtained in a predetermined number of the recognition units and calculating an evaluation value for each of the recognition units.

(9)

An information processing device including:
an execution unit configured to execute unsupervised learning for a model of a recognizer that performs image recognition for an image; and
a determination unit that determines whether learning has been performed correctly or not for the model updated by learning in the execution unit on the basis of an evaluation value found using recognition results obtained by performing image recognition in a predetermined number of models different from each other,
in which the execution unit returns a model to a model before the learning has been performed in a case where it is determined by the determination unit that learning has not been performed correctly.

(10)

The information processing device according to (9),
in which the execution unit executes the learning at timings with a predetermined interval at which the image is acquired, and the evaluation value is found at every constant period longer than the predetermined interval.

(11)

The information processing device according to (9) or (10), further including
a transmission unit configured to transmit predetermined additional information together with the model and the image at a timing at which the evaluation value is found.

(12)

The information processing device according to any one of (9) to (11), further including
a recognition processing unit that sets the newest model updated by the execution unit in a recognizer, performs recognition processing on the image, and outputs a recognition result to a processing unit that performs predetermined processing using the recognition result.

(13)

An information processing method including:
by an information processing device,
executing unsupervised learning for a model of a recognizer that performs image recognition on an image; and
determining whether learning has been performed correctly or not for the model updated by the learning on the basis of an evaluation value found using recognition results obtained by performing image recognition in a predetermined number of models different from each other,
in which a model is returned to a model before the learning has been performed in a case where it is determined that learning has not been performed correctly.

(14)

A system including:
a first information processing device having
a predetermined number of recognition units, for which a model updated by performing image recognition in a predetermined number of terminals and executing unsupervised learning is each set, configured to perform image recognition on an image, on which image recognition has been performed in a predetermined number of the terminals, and
an evaluation value calculation unit that evaluates recognition results obtained in a predetermined number of the recognition units and calculate an evaluation value for each of the recognition units; and
a second information processing device having
an execution unit configured to execute unsupervised learning on a model of a recognizer that performs image recognition on an image, and
a determination unit that determines whether learning has been performed correctly or not for the models updated by learning in the execution unit on the basis of evaluation values found using recognition results obtained by performing image recognition in predetermined number of models different from each other,
in which the execution unit returns a model to a model before the learning has been performed in a case where it is determined by the determination unit that learning has not been performed correctly.

Note that the present embodiment is not limited to the embodiments described above, and various modifications can be made without departing from the gist of the present technology. Furthermore, the effects described herein are merely examples and are not restrictive, and other effects may be obtained.

REFERENCE SIGNS LIST

11 Learning system
12 Network
13 Vehicle
14 Server
21 and 22 Information processing device
31 Image acquisition unit
32 Storage unit
33 Domain adaptation processing execution unit
34 Transmission unit
35 Reception unit
36 Determination unit
37 Recognition processing unit
41 Environmental feature amount calculation unit
42 Domain determination unit
43 Update value calculation unit
51 Reception unit
52 Recognition unit
53 Integration unit
54 Evaluation calculation unit
55 Transmission unit

The invention claimed is:
1. An information processing device comprising:
circuitry configured to
perform image recognition on an image of a predetermined number of images by a predetermined number of recognition processes, respectively, the predetermined number of the images being obtained by a predetermined number of terminals, the predetermined number of the terminals using a model that is updated by performing image recognition in each of the predetermined number of the terminals and executing unsupervised learning in each of the predetermined number of the terminals, evaluate recognition results obtained in the predetermined number of the recognition processes, and calculate an evaluation value for each of the predetermined number of the recognition processes, wherein the learning is performed at timings with a predetermined interval at which each of the predetermined number of images is acquired in each of the predetermined number of terminals, respectively, and wherein the circuitry is configured to calculate the evaluation value at a timing with a constant period that is longer than the predetermined interval.

2. The information processing device according to claim 1, wherein the circuitry is further configured to determine an integrated recognition result in which the recognition results obtained in the predetermined number of the recognition processes are integrated, calculate the evaluation value for each of the recognition processes by using the recognition results obtained in the predetermined number of the recognition processes and the integrated recognition result.

3. The information processing device according to claim 1, wherein the circuitry is configured to perform the image recognition on all images on which the image recognition has been performed in the predetermined number of the terminals.

4. The information processing device according to claim 3, wherein the circuitry is configured to perform image recognition on a certain image obtained by weighting the certain image of a predetermined terminal with additional information transmitted from the predetermined terminal.

5. The information processing device according to claim 4, wherein the circuitry is configured to control reception of the image, the model, and the additional information transmitted from the predetermined number of the terminals, wherein the circuitry is configured to set the model of a certain terminal of the predetermined number of the terminals to a certain recognition process of the predetermined number of the recognition processes that corresponds to the certain terminal, respectively, and supply the predetermined number of the images and a predetermined number of pieces of the additional information to all of the predetermined number of the recognition processes.

6. The information processing device according to claim 1, wherein the circuitry is configured to control transmission of a certain evaluation value for the model being set in a certain recognition process of the predetermined number of the recognition processes, to a certain terminal of the predetermined number of the terminals.

7. An information processing method comprising:

by an information processing device, performing image recognition on an image of a predetermined number of images by a predetermined number of recognition processes, respectively, the predetermined number of the images being obtained by a predetermined number of terminals, the predetermined number of the terminals using a model that is updated by performing image recognition in each of a predetermined number of the terminals and executing unsupervised learning in each of the predetermined number of terminals;

evaluating recognition results obtained in the predetermined number of the recognition processes; and calculating an evaluation value for each of the recognition processes, wherein the learning is performed at timings with a predetermined interval at which each of the predetermined number of images is acquired in each of the predetermined number of terminals, respectively, and wherein the evaluation value is calculated at a timing with a constant period that is longer than the predetermined interval.

8. An information processing device comprising:

circuitry configured to execute unsupervised learning for a model of a recognizer that performs image recognition for an image, and determine whether learning has been performed correctly or not for the model updated by learning on a basis of an evaluation value found using recognition results obtained by performing image recognition in a predetermined number of models different from each other, wherein the circuitry is configured to return the model to an original model that is before the learning has been performed in a case where it is determined that the learning has not been performed correctly, wherein the circuitry is configured to execute the learning at timings with a predetermined interval at which the image is acquired, and wherein the evaluation value is determined at a timing with a constant period that is longer than the predetermined interval.

9. The information processing device according to claim 8, wherein the circuitry is configured to control transmission of predetermined additional information together with the model and the image at a timing at which the evaluation value is determined.

10. The information processing device according to claim 8, wherein the circuitry is configured to set a newest model updated in the recognizer, perform recognition processing on the image, and output a recognition result to perform predetermined processing using the recognition result.

11. An information processing method comprising:

by an information processing device, executing unsupervised learning for a model of a recognizer that performs image recognition on an image; and determining whether learning has been performed correctly or not for the model updated by the learning on a basis of an evaluation value found using recognition results obtained by performing image recognition in a predetermined number of models different from each other, wherein the model is returned to an original model that is before the learning has been performed in a case where it is determined that the learning has not been performed correctly, wherein the learning is executed at timings with a predetermined interval at which the image is acquired, and
wherein the evaluation value is determined at a timing with a constant period that is longer than the predetermined interval.

\* \* \* \* \*